Figure 1:
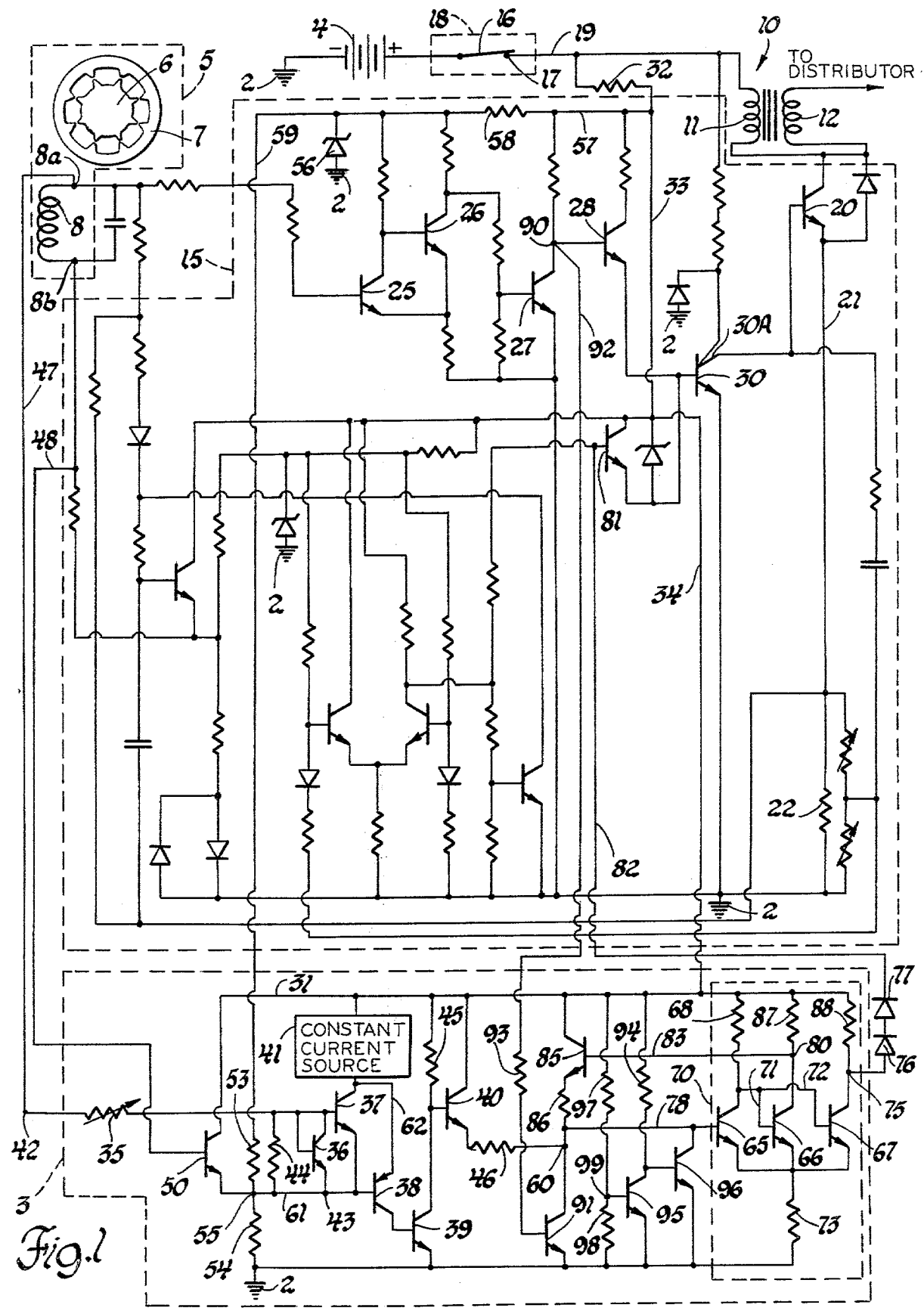

United States Patent [19]

Crowder

[11] 4,245,601
[45] Jan. 20, 1981

[54] INTERNAL COMBUSTION ENGINE SPEED IGNITION SPARK ADVANCE SYSTEM

[75] Inventor: Lawrence W. Crowder, Kokomo, Ind.

[73] Assignee: General Motors Corporation, Detroit, Mich.

[21] Appl. No.: 36,355

[22] Filed: May 7, 1979

[51] Int. Cl.³ .............................................. F02P 3/04
[52] U.S. Cl. ................................................... 123/418
[58] Field of Search ...................... 123/117 R, 148 E

[56] References Cited

U.S. PATENT DOCUMENTS

| | | | |
|---|---|---|---|
| 3,653,367 | 4/1972 | Oishi | 123/148 E |
| 3,838,672 | 10/1974 | Richards et al. | 123/148 E |
| 3,874,351 | 4/1975 | Asler et al. | 123/117 R |
| 3,882,835 | 5/1975 | Randriamanentena | 123/117 R |
| 3,900,015 | 8/1975 | Mainprize | 123/148 E |
| 3,916,855 | 11/1975 | Fauser et al. | 123/117 R |
| 3,990,417 | 11/1976 | Tershak | 123/117 R |
| 4,174,697 | 11/1979 | Podrapsky et al. | 123/148 E |

*Primary Examiner*—Tony M. Argenbright
*Attorney, Agent, or Firm*—Richard G. Stahr

[57] ABSTRACT

In an internal combustion engine electronic ignition system of the type responsive to each of a series of alternating current timing signals of an amplitude directly proportional to engine speed that are induced in the output coil of an electrical generator assembly having at least a rotor member rotated in timed relationship with the engine, the timing signals are overriden by the output signal of a circuit combination that is responsive to a potential level of a predetermined magnitude across the electrical generator assembly output coil to provide an engine speed ignition spark advance within increasing engine speeds greater than a selected value that substantially follows a desired engine speed ignition spark advance curve.

5 Claims, 5 Drawing Figures

INTERNAL COMBUSTION ENGINE SPEED IGNITION SPARK ADVANCE SYSTEM

This invention is directed to internal combustion engine electronic ignition system combinations and, more specifically, to the improvement of an electronic engine speed ignition spark advance system that provides an increasing engine speed ignition spark advance that substantially follows a desired engine speed ignition spark advance curve.

In many prior art internal combustion engine ignition systems, the engine speed ignition spark advance is provided by centrifugal weights that are rotated by the ignition distributor rotor and mechanically coupled to a rotatable distributor breaker plate assembly that carries the ignition points. As the centrifugal weights move outwardly away from the axis of rotation with increasing engine speed, the mechanical linkage coupling the weights and the breaker plate assembly operate to rotate the breaker plate assembly and ignition points in a direction opposite distributor cam rotation to advance the ignition spark. With completely electronic ignition systems responsive to the alternating current output timing signals generated in timed relationship with the engine by an electrical generator assembly having a rotor member rotated by the distributor shaft within the bore of a rotatably mounted stator, the stator is rotated in a direction to advance the ignition spark with increasing engine speeds by centrifugal weights operating through a mechanical linkage coupling the weights to the rotatably mounted stator.

As these mechanical engine speed ignition spark advance systems are subject to breakage, manufacturing tolerance error, mechanical wear, linkage backlash and corrosive or dirty atmospheres, the provision of an electronic engine speed ignition spark advance system that requires no mechanical linkages is desirable.

It is, therefore, an object of this invention to provide an improved internal combustion engine electronic ignition system combination.

It is another object of this invention to provide an improved internal combustion engine electronic ignition system combination including the provision of an all electronic engine speed ignition spark advance system.

It is another object of this invention to provide an improved internal combustion engine electronic ignition system combination that includes an all electronic engine speed ignition spark advance system that is responsive to the alternating current timing signals produced in timed relationship with the engine by an associated electrical generator assembly to produce an output ignition spark signal that is effective to override the timing signal.

In accordance with this invention, there is provided in combination with an internal combustion engine electronic ignition system including an electrical signal responsive electronic control unit for effecting first the completion and later the interruption of the ignition coil primary winding energizing circuit in response to each of a series of alternating current timing signals induced in the output coil of an electrical generator assembly in timed relationship with the engine an all electronic engine speed ignition spark advance system that provides, with engine speeds equal to and greater than a selected value, an increasing engine speed ignition spark advance curve wherein circuitry responsive to an empirically determined timing signal potential level across the output coil of the electrical generator assembly that will provide a desired engine speed ignition spark advance curve produces an output signal that overrides the timing signals when the positive going half cycle of each of the alternating current timing signals rises to an empirically determined potential level.

For a better understanding of the present invention, together with additional objects, advantages and features thereof, reference is made to the following description and accompanying drawing in which:

FIG. 1 sets forth an internal combustion engine electronic ignition system combination including the engine speed ignition spark advance system of this invention in schematic form; and FIGS. 2 through 5, inclusive, are curves useful in understanding the system of FIG. 1.

As point of reference or ground potential is the same point electrically throughout the system, it is illustrated in FIG. 1 of the drawing by the accepted schematic symbol and referenced by the numeral 2.

The electronic engine speed ignition spark advance system of this invention is set forth schematically in FIG. 1 within dashed rectangle 3 and is shown in combination with an internal combustion engine electronic ignition system combination including an electrical generator assembly 5 having a rotor member 6 rotated in timed relationship with an associated internal combustion engine and an output coil 8 in which is induced a series of alternating current timing signals of an amplitude directly proportional to engine speed, an ignition coil 10 having at least a primary winding 11 connected in an electrical energizing circuit and an electrical signal responsive electronic control unit 15 for effecting first the completion of and later the interruption of the ignition coil primary winding 11 energizing circuit in timed relationship with the engine in response to each cycle of the timing signals. The improvement of this invention is an engine speed ignition spark advance system for providing an increasing ignition spark advance with increasing engine speed greater than a selected value by producing, while the engine is operating at a speed equal to and greater than the selected value, an output ignition spark signal that is effective to override the timing signals to effect the interruption of the ignition coil primary winding energizing circuit at an engine crankshaft angle earlier than that at which it would be interrupted by the electronic control unit operating normally in response to the timing signals. In this regard, the interruption of the ignition coil primary winding at an earlier engine crankshaft angle means that this primary winding energizing circuit interruption is effected at a greater engine crankshaft angle before the top dead center position.

In the interest of reducing drawing complexity, the associated internal combustion engine with which the electronic ignition system combination improved by the engine speed ignition spark advance system of this invention may be employed is not shown in FIG. 1. It is to be specifically understood, however, that the circuitry of FIG. 1 may be used with any conventional well known spark ignited internal combustion engine of any number of cylinders.

Figure 2:
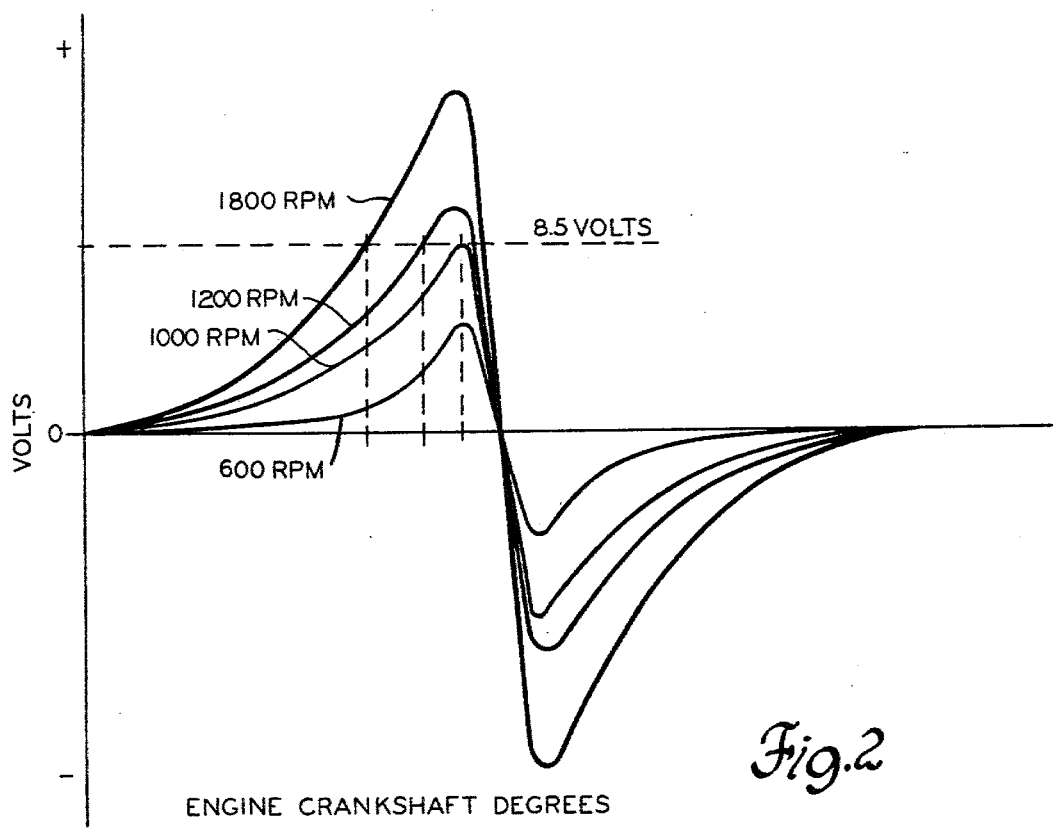

The electronic control unit employed in an actual embodiment of this invention is set forth within dashed rectangle 15 of FIG. 1 in which it is shown in combination with a source of alternating current timing signals, electrical generator assembly 5; a direct current potential source, which may be a conventional storage battery 4, and an ignition coil 10, which may be a conventional automotive type ignition coil well known in the art having a primary winding 11 and a secondary winding 12 in which a high sparking potential is induced upon the interruption of the energizing circuit of primary winding 11. Rotor member 6 of electrical generator assembly 5 is driven by an associated internal combustion engine in timed relationship with the engine in a manner well known in the automotive art. For example, rotor member 6 may be mounted upon the ignition distributor shaft in such a manner as to be rotated therewith while the distributor shaft is rotated in timed relationship with the engine by a gear drive to the engine camshaft as is common in the automotive art. One complete cycle of the alternating current timing signals produced by an actual electrical generator assembly for each of four different engine speeds is illustrated by the curves of FIG. 2. Although these timing signals pass through zero in a positive to a negative going direction at substantially the same engine crankshaft angle, the amplitude of these timing signals is directional proportional to engine speed, the greater the engine speed the greater the amplitude. In the actual embodiment, the peak to peak amplitude of these timing signals across an unloaded output coil is of the order of 8.8 volts at an engine speed of 500 RPM and of the order of 52 volts at an engine speed of 5000 RPM. These amplitudes are considerably less when the output coil is loaded.

The energizing circuit for primary winding 11 of ignition coil 10 may be traced from the positive polarity output terminal of battery 4, through the movable contact 16 and stationary contact 17 of an electrical switch 18, while closed, lead 19, primary winding 11 of ignition coil 10, the collector-emitter electrodes of NPN switching transistor 20, lead 21, resistor 22 and point of reference or ground potential 2 to the negative polarity output terminal of battery 4. As is well known in the automotive art, upon each interruption of the energizing circuit for primary winding 11 of ignition coil 10, an ignition spark potential is induced in secondary winding 12 that is directed by the ignition distributor to the spark plug of the cylinder of the associated engine to be fired. With regard to electrical switch 18, movable contact 16 and stationary contact 17 may be the normally open "ignition circuit" contacts of a conventional automotive type ignition switch.

The source of alternating current timing signals, electrical generator assembly 5, may be any one of the several conventional magnetic distributors well known in the automotive art. One example of a magnetic distributor well known in the automotive art suitable for use with the system of this invention is of the variable reluctance type disclosed and described in U.S. Pat. No. 3,254,247, Falge, which issued May 31, 1966 and is assigned to the same assignee as that of the present invention. In the interest of reducing drawing complexity, the variable reluctance type ignition distributor disclosed and described in U.S. Pat. No. 3,254,247 has been set forth schematically in the drawing. Rotor member 6 is rotated in timed relationship with the associated engine by the engine in a manner well known in the automotive art within the bore of a pole piece 7. Equally spaced about the outer periphery of rotor member 6 and about the bore of pole piece 7 are a series of projections equal in number to the number of cylinders of the engine with which the distributor and system of this invention is being used. The electrical generator assembly 5 illustrated in FIG. 1 is for use with an eight cylinder engine. Pole piece 7 may be made up of a stack of a number of laminations of magnetic material secured in stacked relationship by rivets or bolts or other fastening methods and the magnetic flux may be provided by a permanent magnet, not shown, which may be secured to the lower face surface thereof. As each projection on rotor member 6 approaches a projection on pole piece 7, the reluctance of the magnetic path between rotor member 6 and pole piece 7 decreases and as each projection on rotor member 6 moves away from a projection on pole piece 7, the reluctance of the magnetic circuit between rotor member 6 and pole piece 7 increases. Consequently, the magnetic field produced by the permanent magnet increases and decreases as each projection on rotor member 6 approaches and passes a projection on pole piece 7, a condition which induces an alternating current potential in pickup coil 8, which is magnetically coupled to pole piece 7, of a waveform substantially as shown in FIG. 2.

One example of an electronic control unit with which the electronic engine speed ignition spark advance system of this invention may be used is disclosed and described in detail in U.S. Pat. No. 3,838,672, Richards et al, that issued Oct. 1, 1974 and is assigned to the same assignee as that of the present invention. Briefly, during the positive polarity excursion of each cycle of the alternating current timing signals induced in output coil 8 of electrical generator assembly 5, NPN transistor 25 is conductive through the collector-emitter electrodes. While transistor 25 is conducting, NPN transistor 26 is not conductive. While NPN transistor 26 is not conductive, base-emitter drive current is supplied to NPN transistor 27. This base-emitter drive current triggers NPN transistor 27 conductive through the collector-emitter electrodes to drain base drive current away from NPN transistor 28, consequently, transistor 28 is not conductive. With transistor 28 not conductive, the circuit through which base-emitter drive current is supplied to control transistor 30 is interrupted, consequently, control transistor 30 is also not conductive. Control transistor 30 is a silicon planar transistor described in detail in the aforementioned U.S. Pat. No. 3,838,672. Briefly, however, while this transistor is not conductive through the collector-emitter electrodes, current flows through the quasi collector electrode 30A and while this device is conducting through the collector-emitter electrodes, substantially no current flows through the quasi collector electrode 30A. As control transistor 30 is not conductive through the collector-emitter electrodes thereof at this time, current flows through quasi collector electrode 30A to supply base-emitter drive current to NPN switching transistor 20. This drive current triggers NPN switching transistor 20 conductive through the collector-emitter electrodes thereof to complete the previously described energizing circuit for primary winding 11 of ignition coil 10. Later during each same cycle of the timing signals when the potential level of this cycle passes through zero in a negative going direction, NPN transistor 25 is triggered not conductive through the collector-emitter electrodes thereof. With NPN transistor 25 not conductive, base-emitter drive current is supplied to NPN transistor 26 to trigger this device conductive through the collector-emitter electrodes thereof, a condition that drains base-emitter drive current from NPN transistor 27. As a consequence, while transistor 26 is conductive through the collector-emitter electrodes, NPN transistor 27 is not conductive. While NPN transistor 27 is not conductive, base-emitter drive current is supplied to NPN transistor 28 to trigger this device conductive through the collector-emitter electrodes thereof, a condition which supplies base-emitter drive to control transistor 30. This base-emitter drive current triggers control transistor 30 conductive through the collector-emitter electrodes thereof. While control transistor 30 is conductive through the collector-emitter electrodes, substantially no current flows through quasi collector electrode 30A. With no current flowing through this quasi collector electrode, base-emitter drive current is removed from NPN switching transistor 20. Upon the removal of this base-emitter drive current, NPN switching transistor 20 is abruptly rendered not conductive through the collector-emitter electrodes thereof to interrupt the previously described primary winding 11 energizing circuit. Upon the interruption of this energizing circuit, an ignition spark potential is induced in secondary winding 12 and is directed through the ignition distributor to the spark plug of the engine cylinder to be fired in a manner well known in the automotive art. The remainder of the circuitry within dashed rectangle 15 provides dwell time and primary winding 11 energizing current limit capabilities as described in detail in the aforementioned U.S. Pat. No. 3,838,672.

While the associated engine is in the running mode, rotor member 6 of electrical generator assembly 5 is rotated in timed relationship therewith to produce an alternating current timing signal waveform in output coil 8 of a waveform substantially as illustrated by each of the curves of FIG. 2 in a manner previously described.

Figure 3:
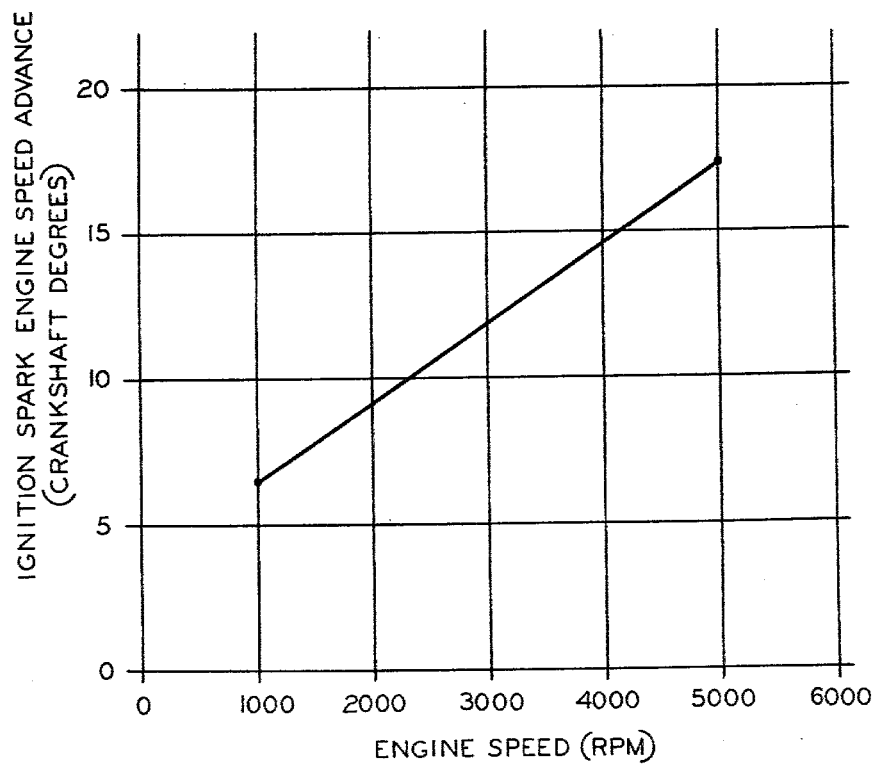

The purpose of the electronic engine speed ignition spark advance system of this invention is to provide an increasing engine speed ignition spark advance with increasing engine speed greater than a selected value that substantially follows a desired engine speed ignition spark advance curve such as that set forth in FIG. 3 by producing an output ignition spark signal that is effective to override the timing signals while the engine is operating at a speed equal to and greater than the selected value. This system is set forth schematically within dashed rectangle 3 of FIG. 1.

During normal operation of electronic control unit 15 in combination with electrical generator assembly 5, electronic control unit 15 is activated to complete the ignition coil primary winding 11 energizing circuit during the positive polarity of each half cycle of the timing signals induced in output coil 8 of electrical generator assembly 5 when the timing signal potential has risen to a level of the order of 0.4 of a volt across output coil 8 and is activated to effect an ignition spark by abruptly interrupting the ignition coil primary winding 11 energizing circuit when the timing signal potential level passes through zero in a negative going direction during the steep negative going portion of the same half cycle. To provide an ignition spark advance from the normal operation, therefore, it is necessary that the electronic control unit 15 be activated to effect an ignition spark during the positive going portion of each of timing signal positive polarity half cycle. Therefore, the timing signal potential level across output coil 8 of electrical generator assembly 5 during each positive going portion of each positive polarity half cycle thereof at which electronic control unit 15 must be activated to effect an ignition spark that will produce an engine speed ignition spark advance that substantially follows a desired engine speed ignition spark advance curve is empirically determined.

Figure 4:
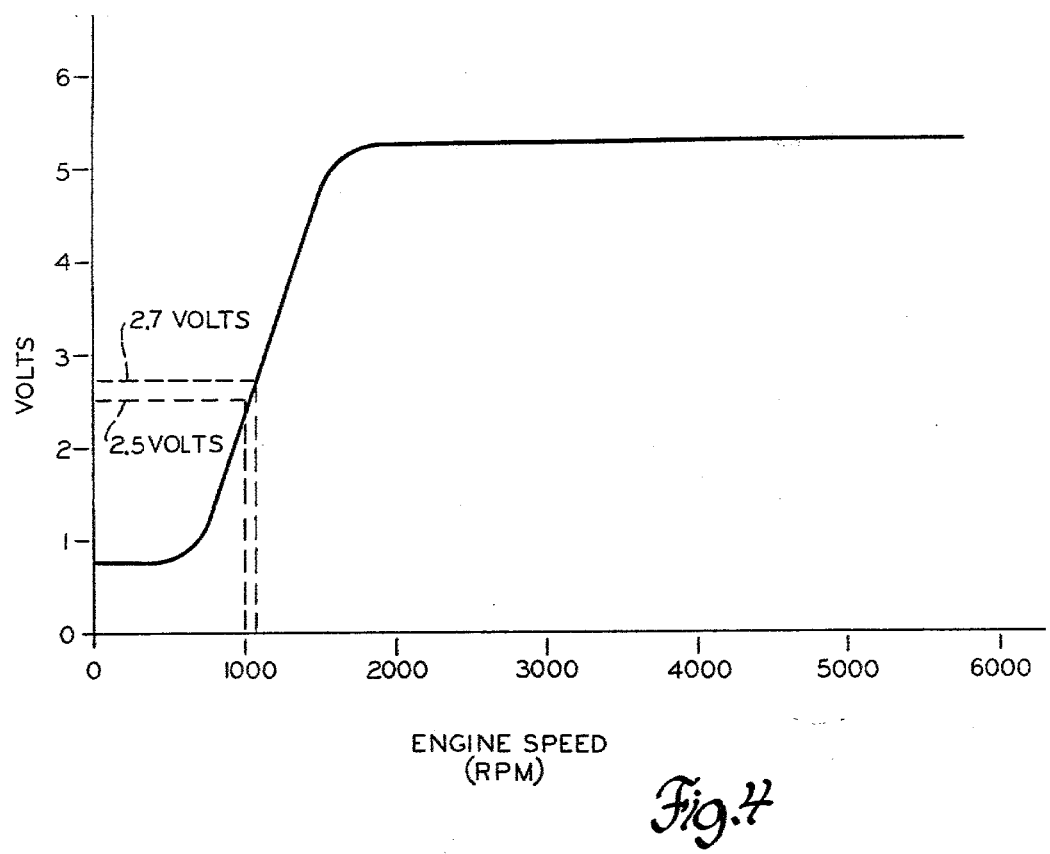

In addition to the hereinabove set forth empirical determination, the peak positive polarity amplitude of the potential across terminal end 8a of output coil 8 of electrical generator assembly 5 with respect to point of reference or ground potential 2 at the selected engine speed value is empirically determined and the potential level magnitude upon terminal end 8b of output coil 8 with respect to point of reference or ground potential 2 is empirically determined over a range of engine speeds from idle to maximum. The potential level magnitude upon terminal end 8b of output coil 8 of electrical generator assembly 5 with respect to point of reference or ground potential 2 was determined to be shown by the curve of FIG. 4 wherein the potential level magnitude in volts upon terminal end 8b of output coil 8 with respect to point of reference or ground potential 2 is plotted against engine speed in RPM. As shown by the curve of FIG. 4, the potential level magnitude upon terminal end 8b of output coil 8 with respect to point of reference or ground potential 2 is substantially constant and of a low minimum value with engine speeds up to a first value, increases substantially linearly to a substantially constant maximum value with an increase of engine speed between the first value and a second value and remains at the substantially maximum constant value with engine speeds greater than the second value. In the actual embodiment, the substantially constant minimum low potential level upon terminal end 8b of output coil 8 with respect to point of reference or ground potential 2 is of the order of 0.7 of a volt with engine speeds up to the order of 650 RPM, increases substantially linearly to a maximum potential level of the order of 5.2 volts between engine speeds of the order of 650 RPM and 1500 RPM and remains substantially constant at the maximum potential level of 5.2 volts with engine speeds greater than 1500 RPM.

FIG. 3 sets forth an actual engine speed ignition spark advance curve for an engine for which it is desirable to provide an increasing engine speed ignition spark advance with engine speeds equal to and greater than the selected value of 1000 RPM. For this engine, it is desired that the engine speed ignition spark advance be of the order of 6.5 engine crankshaft degrees at the selected engine speed of 1000 RPM at which the alternating current timing signals produced by electrical generator assembly 5 are to be overridden and, thereafter, it is desired that the engine speed ignition spark advance increase with engine speed up to the order of 17.5 engine crankshaft degrees at 5000 engine RPM.

With reference to dashed rectangle 3 of FIG. 1, while the contacts 16 and 17 of electrical switch 18 are electrically closed, battery 4 operating potential appears across positive polarity potential line 31 and point of reference or ground potential 2 through closed switch 18, lead 19, resistor 32 and leads 33 and 34.

Figure 5:
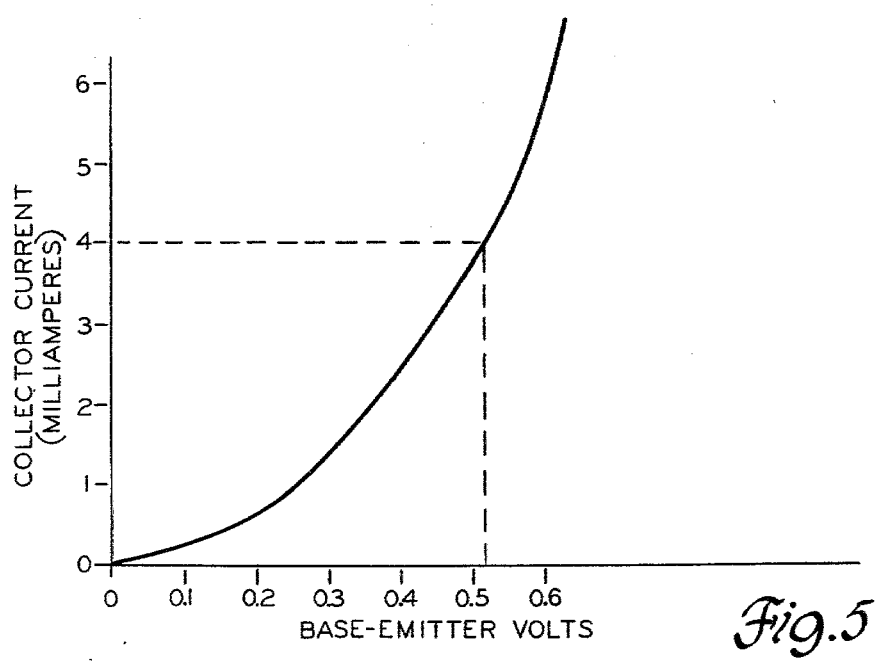

In a manner to be later explained in detail in this specification, the circuit combination within dashed rectangle 3 of FIG. 1 including variable resistor 35, NPN transistor 36, connected as a diode, NPN transistor 37, PNP transistor 38, NPN transistors 39 and 40 and constant current source 41 is responsive to a selected input signal potential level across the input circuitry thereof for producing an output trigger signal. As constant current source 41 may be any one of the several constant current sources well known in the art and, per se, forms no part of this invention, it is illustrated in block form in FIG. 1. For purposes of this specification and without intention or inference of a limitation thereto, the input circuitry of this circuit combination will be considered to be input circuit points 42 and 43. In this trigger signal producing circuit combination, resistor 44 is a temperature compensating resistor and resistors 45 and 46 are current limiting resistors. Although NPN transistor 36 is connected as a diode, it is necessary that the collector-emitter conduction characteristics of NPN transistors 36 and 37 be matched, that these two devices not be discrete and that these two devices must be on the same silicon die material. This is necessary so that with an input signal applied across input circuit points 42 and 43 of a sufficient magnitude to produce conduction through these devices, the current flow through each is equal to the current flow through the other. In FIG. 5 there is illustrated a typical NPN transistor collector current versus applied base-emitter voltage curve. From this curve it is apparent that, with substantially equal conduction characteristics, with the same applied input base-emitter voltage across input circuit points 42 and 43, the collector current flow through both of these transistors 36 and 37 will be equal.

Terminal end 8a of output coil 8 of electrical generator assembly 5 is connected through lead 47 to one input circuit point 42 of the hereinabove described circuit combination for producing an output trigger signal.

The other terminal end 8b of output coil 8 of electrical generator assembly 5 is connected through lead 48 to the control or base electrode of NPN transistor 50, the collector electrode of which is connected to positive polarity potential line 31 and the emitter electrode of which is connected to junction 55 between series resistors 53 and 54. A regulated direct current potential, as determined by the inverse breakdown potential of Zener diode 56 of the electronic control unit 15 is applied across series connected resistors 53 and 54 and point of reference or ground potential 2 through the contacts 16 and 17 of switch 18, when closed, lead 19, resistor 32, lead 57, resistor 58 and lead 59. The resistance values of series resistors 53 and 54 are so proportioned relative to each other that the potential with respect to point of reference or ground potential 2 upon junction 55, hereinafter referred to as a reference potential, is of a positive polarity and of such a level that the difference between this level and the peak positive polarity amplitude of the potential upon terminal end 8a of output coil 8 of electrical generator assembly 5 with respect to point of reference or ground potential 2 at the selected engine speed is equal to the sum of the empirically determined timing signal potential level across output coil 8 that is required to produce an engine speed ignition spark advance that substantially follows a desired engine speed ignition spark advance curve plus the base-emitter diode drop across the NPN transistor selected as NPN transistor 50.

Terminal end 8a of output coil 8 of electrical generator assembly 5 is connected through lead 47 to one input circuit point 42 of the hereinabove described circuit combination for producing an output trigger signal and the output circuitry, junction 55, of the NPN transistor 50 and series resistors 53 and 54 circuit combination is connected through lead 61 to the other input circuit point 43 of the trigger signal producing circuit combination. Therefore, the difference between the peak positive polarity amplitude of the potential upon terminal end 8a of output coil 8 at the selected engine speed minus the reference potential level upon output junction 55 is the selected input signal potential level for the trigger signal producing circuit combination.

In the actual embodiment, the timing signal potential level across output coil 8 of electrical generator assembly 5 during each positive going portion of each positive polarity half cycle thereof at which electronic control unit 15 must be activated to effect an ignition spark that will produce an engine speed ignition spark advance that substantially follows a desired engine speed ignition spark advance curve was empirically determined to be 8.5 volts, the NPN transistor employed as NPN transistor 50 has a base-emitter diode drop of 0.7 of a volt and the peak positive polarity amplitude of the potential across terminal end 8a of output coil 8 of electrical generator assembly 5 with respect to point of reference or ground potential 2 at the selected engine speed of 1000 RPM was empirically determined to be 11.2 volts. Therefore, the resistance values of series resistors 53 and 54 are so proportioned relative to each other that the potential with respect to point of reference or ground potential 2 upon output junction 55 is of a positive polarity and of a level of 2.0 volts. The difference between this level of 2.0 volts and the peak positive polarity amplitude of 11.2 volts of the potential across terminal end 8a of output coil 8 of electrical generator assembly 5 with respect to point of reference or ground potential 2 at the selected engine speed of 1000 RPM is 9.2 volts which is equal to the sum of the empirically determined timing signal potential level of 8.5 volts across output coil 8 that is required to produce an engine speed ignition spark advance that substantially follows a desired engine speed ignition spark advance curve plus the base-emitter diode drop of 0.7 of a volt across the NPN transistor selected as NPN transistor 50.

To calibrate the system of this invention for proper operation with the hereinabove set forth potential level determinations, the resistance value of variable resistor 35 is so adjusted that, with engine speeds equal to and greater than the selected value, the selected input signal potential level of the input signal across input circuit points 42 and 43 will supply the necessary base drive current to NPN transistors 36 and 37 to render these devices conductive but, with engine speeds less than the selected value, the potential level of the signal across input circuit points 42 and 43 will not supply sufficient drive current to NPN transistors 36 and 37 to render these devices conductive. It is the potential level of the input signal applied across input circuit points 42 and 43, therefore, that establishes the level of current flow through NPN transistors 36 and 37.

The following detailed description of the electronic engine speed ignition spark advance system of this invention will be with regard to the actual embodiment. Referring to the curve of FIG. 4, the potential level upon terminal end 8b of output coil 8 of electrical generator assembly 5 with respect to point of reference or ground potential 2 is of the order of 2.5 volts at the selected engine speed of 1000 RPM and is of a lower level with engine speeds less than this selected engine speed.

With engine speeds less than the selected 1000 RPM value, NPN transistor 50 is not conductive because of the reference potential of 2.0 volts upon junction 55 and because of the resistance value of resistor 35 as hereinabove set forth, the input signal applied across input circuit points 42 and 43 of the trigger signal producing circuit combination is not of a sufficient potential level to supply sufficient base drive current to NPN transistors 36 and 37 to render these devices conductive. This is for the reason that the resistance value of resistor 35 is so adjusted that the input signal across input circuit points 42 and 43 will supply base drive current to NPN transistors 36 and 37 only with engine speeds equal to and greater than the selected value as is hereinabove set forth. Therefore, constant current source 41 supplies emitter-base drive current through lead 62 to PNP transistor 38. This emitter-base drive current renders PNP transistor 38 conductive through the emitter-collector electrodes thereof to supply base-emitter drive current to NPN transistor 39. This base-emitter drive current renders NPN transistor 39 conductive through the collector-emitter electrodes thereof. While NPN transistor 39 is conductive through the collector-emitter electrodes, base-emitter drive current is drained away from NPN transistor 40, consequently, NPN transistor 40 is not conductive. With transistor 40 not conductive, there is no output signal present upon output junction 60. With no output signal present upon output junction 60, there is no base-emitter drive current supplied to NPN transistor 65 of a trigger circuit 70 including NPN transistors 65, 66, and 67 and the associated circuitry, consequently, NPN transistor 65 is not conductive. While NPN transistor 65 is not conductive, base-emitter drive current is supplied to both of NPN transistors 66 and 67 through a circuit which may be traced from the positive polarity potential line 31, resistor 68 and respective leads 71 and 72. As a result of this base-emitter drive current, trigger circuit 70 is in the initial operating state with both of NPN transistors 66 and 67 conductive through collector-emitter electrodes thereof. While trigger circuit 70 is in the initial operating state with transistors 66 and 67 conductive, the output signal upon output junction 75 is of a potential level substantially equal to the sum of the potential drops across common emitter resistor 73 and conducting transistor 67. Series diodes 76 and 77 are included to provide a potential drop thereacross substantially equal to the sum of the potential drop across common emitter resistor 73 and the collector-emitter voltage drop across NPN transistor 67 of trigger circuit 70. Therefore, there is no output ignition spark signal supplied to the electronic control unit 15 through line 82.

When an engine speed equal to the selected 1000 RPM value, NPN transistor 50 is rendered not conductive by the reference potential of 2.0 volts upon junction 55 for the reason that the potential level upon terminal end 8b of output coil 8 of electrical generator assembly 5 is not at the 2.7 volt level required to overcome the reference potential upon junction 55. However, the selected input signal potential level is applied across input circuit points 42 and 43 of the trigger signal producing circuit combination and is of a sufficient potential level to supply sufficient drive current through resistor 35 to NPN transistors 36 and 37 to render these devices conductive, as previously set forth. Upon the conduction of NPN transistors 36 and 37, emitter-base drive current is diverted from PNP transistor 38, a condition which renders this device not conductive. Upon NPN transistor 38 going not conductive, base-emitter drive current is no longer supplied to NPN transistor 39, consequently, this device is rendered not conductive. With NPN transistor 39 not conductive, base-emitter drive current is supplied to NPN transistor 40 through a circuit which may be traced from the positive polarity potential line 31 through resistor 45. This base-emitter drive current renders NPN transistor 40 conductive through the collector-emitter electrodes to produce an output positive polarity trigger signal upon junction 60. This output positive polarity trigger signal effects the triggering of trigger circuit 70 to the alternate state of operation by supplying base-emitter drive current through lead 78 to NPN transistor 65 to render NPN transistor 65 conductive through the collector-emitter electrodes. Upon the conduction of NPN transistor 65, transistors 66 and 67 are abruptly rendered not conductive. When these transistors go not conductive, trigger circuit 70 has been triggered to the alternate state of operation. Resistors 87 and 88 are collector resistors for respective NPN transistors 66 and 67. While trigger circuit 70 is in the alternate state of operation with NPN transistors 66 and 67 not conductive, a higher positive polarity potential signal is present upon both junctions 75 and 80. The positive polarity potential output ignition spark signal upon junction 75 supplies base-emitter drive current to NPN transistor 81 of the electronic control unit 15 through a circuit which may be traced from output junction 75 through series diodes 76 and 77 and lead 82. This base-emitter drive current triggers NPN transistor 81 conductive through the collector-emitter electrodes to supply base-emitter drive current to control transistor 30. This base-emitter drive current renders control transistor 30 conductive through the collector-emitter electrodes thereof and, as a consequence, current no longer flows from quasi collector electrode 30A. With the cessation of current flow from quasi collector electrode 30A, base-emitter drive current is no longer supplied to NPN switching transistor 20. Consequently, NPN switching transistor 20 is rendered not conductive to interrupt the previously described energizing circuit for primary winding 11 of ignition coil 10. Upon the interruption of this energizing circuit, an ignition spark potential is induced in secondary winding 12 and is directed through the ignition distributor to the spark plug of the engine cylinder to be fired, as is well known in the automotive art. Therefore, the electronic engine speed ignition spark advance system of this invention operates to override the alternating current timing signals induced in output coil 8 of electrical generator assembly 5 to initiate an ignition spark event at an engine crankshaft angle earlier than that at which an ignition spark would have been initiated by the alternating current timing signals to thereby provide an engine speed ignition spark advance.

With engine speeds equal to and greater than the engine speed at which the potential level upon terminal end 8b of output coil 8 of electrical generator assembly 5 with respect to point of reference or ground potential 2 is of a magnitude equal to and greater than the sum of the reference potential upon output circuit junction 55 plus the base-emitter diode drop across NPN transistor 50, base-emitter drive current is supplied to NPN transistor 50 to render this device conductive through the collector-emitter electrodes thereof. Because NPN transistor 50 is connected in an emitter follower configuration, while NPN transistor 50 is conductive at these engine speeds, the potential upon output circuit junction 55 substantially follows the potential level with respect to point of reference or ground potential 2 upon terminal end 8b of output coil 8 of electrical generator assembly 5 less the forward base-emitter diode potential drop through NPN transistor 50. At these engine speeds, therefore, the input signal applied across input circuit points 42 and 43 of the trigger signal producing circuit combination is of a level equal to the selected input signal potential level when the potential across output coil 8 is of a value equal to the empirically determined timing signal potential level across output coil 8 during each positive going portion of each positive polarity half cycle of the timing signals at which electronic control unit 15 must be activated to effect an ignition spark that will produce an engine speed ignition spark advance that substantially follows a desired engine speed ignition spark advance curve. This is because, at these engine speeds, NPN transistor 50 is conductive and, therefore, the potential upon output junction 55 and, consequently, input circuit point 43 is always one NPN transistor 50 base-emitter diode drop less than the potential upon terminal end 8b of output coil 8 with respect to point of reference or ground potential 2. Therefore, the potential across input circuit points 42 and 43, at these engine speeds, is always equal to the potential appearing across output coil 8 plus the NPN transistor 50 base-emitter diode drop. Where $E_s$ is the selected input signal potential level, $E_1$ is the potential upon terminal end 8a of output coil 8 with respect to ground potential 2; $E_2$ is the potential upon junction 55 and input circuit point 43 with respect to ground potential 2; $E_{be}$ is the forward base-emitter diode drop of NPN transistor 50; $E_3$ is the potential upon terminal end 8b of output coil 8 with respect to ground potential 2 and $E_4$ is the potential across output coil 8:

$E_s = E_1 - E_2$
$E_1 = E_4 + E_3$
$E_2 = E_3 - E_{be}$
$E_s = (E_4 + E_3) - (E_3 - E_{be})$
$E_s = E_4 - (-E_{be})$
$E_s = E_4 + E_{be}$

Referring to FIG. 4, the engine speed at which the potential level upon terminal end 8b of output coil 8 of electrical generator assembly 5 with respect to point of reference or ground potential 2 is 2.7 volts is of the order of 1125 RPM. This 2.7 volt level is equal to the sum of 2.0 volt reference potential upon output circuit junction 55 plus the 0.7 of a volt diode drop across NPN transistor 50. Consequently, base-emitter drive current is supplied to NPN transistor 50 to render this device conductive through the collector-emitter electrodes thereof. While NPN transistor 50 is conductive, the potential upon output circuit junction 55 follows the potential with respect to point of reference or ground potential 2 upon terminal end 8b of output coil 8 of electrical generator assembly 5 less the forward base-emitter diode potential drop through NPN transistor 50. As terminal end 8a of output coil 8 is connected to input circuit point 42 and output circuit junction 55 is connected to input circuit point 43 of the trigger signal producing circuit combination, with engine speeds equal to and greater than the engine speed at which the potential level upon terminal end 8b of output coil 8 is equal to the reference potential level upon output junction 55 as established by series resistors 53 and 54 plus one forward base-emitter diode drop across NPN transistor 50, when the potential level across output coil 8 reaches a magnitude of 8.5 volts, an input signal of the selected potential level of 9.2 volts is applied across the input circuit points 42 and 43 of the trigger signal producing circuit combination (8.5 volts +0.7 of a volt forward base-emitter diode drop across NPN transistor 50). This input signal supplies base-emitter drive current to NPN transistors 36 and 37 to render these two devices conductive. Upon the conduction of NPN transistors 35 and 37, an output positive polarity trigger signal is produced upon junction 60 in a manner previously explained. This positive polarity trigger signal triggers trigger circuit 70 to the alternate state of operation in which a positive polarity potential output ignition spark signal is present upon junction 75, as has been previously explained, to initiate an ignition spark event.

As has been previously brought out, one complete cycle of the alternating current timing signals induced in output coil 8 of electrical generator assembly 5 for each of four different engine speeds is illustrated by the curves of FIG. 2 wherein the potential level in volts across output coil 8 is plotted against engine crankshaft degrees. Although these timing signals pass through zero in a positive to a negative going direction at substantially the same engine crankshaft angle, the amplitude of these timing signals is directional proportional to engine speed, the greater the engine speed the greater the amplitude. With the normal operation of the electronic ignition system combination in response to the timing signals, an ignition spark event is initiated at substantially the same engine crankshaft angle at substantially the time the timing signal passes through zero in a positive to a negative going direction for all engine speeds. With the improvement of the electronic engine speed ignition spark advance system of this invention, an ignition spark event is initiated when the timing signal potential level across output coil 8 of electrical generator assembly 5 reaches the empirically determined potential level during each positive going portion of each positive polarity half cycle thereof at which electronic control unit 15 must be activated to effect an ignition spark that will produce an engine speed ignition spark advance that substantially follows a desired engine speed ignition spark advance curve. In the actual embodiment, this potential level was empirically determined to be 8.5 volts. Therefore, when the potential level across output coil 8 of electrical generator assembly 5 reaches 8.5 volts in the actual embodiment, an ignition spark event is initiated in a manner previously explained in detail. As shown by the curves of FIG. 2, at the selected engine speed of 1000 RPM an ignition spark event is initiated at the 8.5 volt potential level of the timing signals at an engine crankshaft angle earlier than that at which the timing signals pass through zero in a positive to a negative going direction. At the higher engine speeds of 1200 RPM and 1800 RPM, the ignition spark event is initiated at respective earlier engine crankshaft angles for the reason that the 8.5 volt potential level of the timing signals is reached at respective earlier engine crankshaft angles. The system of this invention, therefore, provides an electronic engine speed ignition spark advance of increasing values with increasing engine speeds greater than a selected value. In this regard, since the 8.5 volt potential level of the timing signals is not reached with engine speeds less than the selected value, the ignition system combination operates normally in response to the timing signals at these engine speeds.

From the foregoing description, it is apparent that the circuit combination of NPN transistor 50 and series resistors 53 and 54 comprises circuitry including output circuitry, junction 55, for producing a reference potential upon the output circuitry that is of a selected minimum level while the potential level of the alternating current timing signals across the electrical generator assembly 5 output coil 8 is less than a selected value and that follows the potential level with respect to a point of reference potential 2 upon a selected terminal end 8b of the electrical generator assembly 5 output coil 8 while the potential level of the alternating current timing signals is equal to and greater than a selected value; that that portion of the engine speed ignition spark advance system of this invention including NPN transistor 50 and series resistors 53 and 55 and the previously described trigger signal producing circuit combination in combination is responsive to the alternating current timing signals for producing an output trigger signal upon junction 60 when the potential level of the alternating current timing signals across the electrical generator assembly 5 output coil 8 reaches a predetermined magnitude; and that within this last combination, the trigger signal producing circuit combination includes input circuitry, input circuit points 42 and 43, and is responsive to a selected input signal potential level for producing an output trigger signal upon junction 60.

The positive polarity potential signal upon junction 80 of trigger circuit 70 when in the alternate state of operation supplies base-emitter drive current through lead 83 to NPN transistor 85 to render this device conductive through the collector-emitter electrodes thereof. Upon the conduction of NPN transistor 85, baseemitter drive current is supplied to NPN transistor 65 through a circuit which may be traced from positive polarity potential line 31, the collector-emitter electrodes of NPN transistor 85, resistor 86 and lead 78. Transistor 85, therefore, operates as a latch, to latch trigger circuit 70 in the alternate state of operation to which it is operated in response to the trigger signal upon junction 60 whereby the ignition spark signal upon junction 75 is maintained upon the electronic control unit 15 to prevent the reenergization of the ignition coil 10 primary winding 11 while the ignition spark signal is maintained for the reason that, so long as the ignition spark signal is maintained, NPN transistor 81 of the electronic control unit 15 is maintained conductive. As previously explained, while NPN transistor 81 is conductive, switching transistor 20 is not conductive.

As the alternating current timing signals produced by electrical generator assembly 5 are continuously applied to the electronic control unit 15, when the positive polarity half cycle of any of the series of timing signals during which the timing signal is overridden by the ignition signal produced by the circuit of this invention passes through zero in a positive to a negative polarity direction, transistor 25 of electronic control unit 15 is triggered not conductive, transistor 26 is triggered conductive and transistor 27 is triggered not conductive as has been previously explained. When transistor 27 goes not conductive, a positive polarity potential signal appears upon junction 90. This positive polarity signal supplies base-emitter drive current to NPN transistor 91 through lead 92 and resistor 93. The base-emitter drive current triggers NPN transistor 91 conductive through the collector-emitter electrodes thereof to drain base-emitter drive current from NPN transistor 65 of the trigger circuit 70. Therefore, NPN transistor 65 goes not conductive and transistors 66 and 67 go conductive to place the trigger circuit 70 in the initial operating state wherein the potential signal upon each of junctions 75 and 80 is of a potential level substantially equal to the potential drop across common emitter resistor 73 plus the potential drop across the collector-emitter electrodes of respective transistors 66 and 67. These signals are each of an insufficient level to maintain respective NPN transistors 81 and 85 conductive, consequently, the electronic engine speed ignition spark advance system of this invention is unlatched.

NPN transistors 95 and 96 are employed for the purpose of disabling the electronic engine speed ignition spark advance system of this invention with low battery potential less than a selected value. The resistance value of series resistors 97 and 98 are proportioned relative to each other that the potential upon junction 99 is of a sufficient level to supply base-emitter drive current to NPN transistor 95 while battery potential level is equal to or greater than the selected low battery potential and is of an insufficient level to supply base-emitter drive current to NPN transistor 95 while battery potential level is less than the selected low battery potential. When transistor 95 goes not conductive with battery potential level less than the selected low battery potential, baseemitter drive current is supplied through resistor 94 to NPN transistor 96 to trigger this device conductive through the collector-emitter electrodes. Upon the conduction of NPN transistor 96, the base electrode of NPN transistor 65 of trigger circuit 70 is clamped at substantially ground potential, a condition which maintains the electronic engine speed ignition spark advance system of this invention disabled with battery potentials less than the selected low battery potential level.

Resistors 87 and 88 are collector resistors for respective NPN transistors 66 and 67.

While a preferred embodiment of the electronic engine speed ignition spark advance system of this invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. In an internal combustion engine electronic ignition system combination including an electrical generator assembly having a rotor member rotated in timed relationship with the engine and an output coil in which is induced a series of alternating current timing signals of an amplitude directly proportional to engine speed, an ignition coil having at least a primary winding connected in an electrical energizing circuit and an electrical signal responsive electronic control unit for effecting first the completion of and later the interruption of the ignition coil primary winding energizing circuit in timed relationship with the engine in response to each cycle of the timing signals, the improvement of an electronic engine speed ignition spark advance system for providing an increasing ignition spark advance with increasing engine speed greater than a selected value by producing, while the engine is operating at a speed equal to and greater than the selected value, an output ignition spark signal that is effective to override the timing signals to effect the interruption of the ignition coil primary winding energizing circuit at an engine crankshaft angle earlier than that at which it would be interrupted by the electronic control unit operating normally in response to the timing signals comprising:

means responsive to said timing signals for producing a first signal when the potential level of said alternating current timing signals across said electrical generator assembly output coil reaches a predetermined magnitude; and means responsive to said first signal for producing a second signal and for applying said second signal to said electronic control unit of said electronic ignition system combination in such a manner that said electronic control unit is responsive thereto to effect the interruption of said ignition coil primary winding energizing circuit whereby, while said engine is operating at a speed equal to and greater than said selected value, an increasing engine speed ignition spark advance is provided with increasing engine speed.

2. In an internal combustion engine electronic ignition system combination including an electrical generator assembly having a rotor member rotated in timed relationship with the engine and an output coil in which is induced a series of alternating current timing signals of an amplitude directly proportional to engine speed, an ignition coil having at least a primary winding connected in an electrical energizing circuit and an electrical signal responsive electronic control unit for effecting first the completion of and later the interruption of the ignition coil primary winding energizing circuit in timed relationship with the engine in response to each cycle of the timing signals, the improvement of an electronic engine speed ignition spark advance system for providing an increasing ignition spark advance with increasing engine speed greater than a selected value by producing, while the engine is operating at a speed equal to and greater than the selected value, an output ignition spark signal that is effective to override the timing signals to effect the interruption of the ignition coil primary winding energizing circuit at an engine crankshaft angle earlier than that at which it would be interrupted by the electronic control unit operating normally in response to the timing signals comprising:

means including input circuit means responsive to a selected input signal potential level for producing a first signal;

means including output circuit means responsive to said timing signals for producing a reference potential upon said output circuit means that is of a selected minimum level while the potential level of said alternating current timing signals across said electrical generator assembly output coil is less than a selected value and that follows the potential level with respect to a point of reference potential upon a selected terminal end of said electrical generator assembly output coil while the potential level of said alternating current timing signals is equal to and greater than said selected value;

means for connecting the other terminal end of said electrical generator assembly output coil and said output circuit means of said reference potential producing means across said input circuit means of said means for producing said first signal; and means responsive to said first signal for producing a second signal and for applying said second signal to said electronic control unit of said electronic ignition system combination in such a manner that said electronic control unit is responsive thereto to effect the interruption of said ignition coil primary winding energizing circuit whereby, while said engine is operating at a speed equal to and greater than said selected value, an increasing engine speed ignition spark advance is provided with increasing engine speed.

3. In an internal combustion engine electronic ignition system combination including an electrical generator assembly having a rotor member rotated in timed relationship with the engine and an output coil in which is induced a series of alternating current timing signals of an amplitude directly proportional to engine speed, an ignition coil having at least a primary winding connected in an electrical energizing circuit and an electrical signal responsive electronic control unit for effecting first the completion of and later the interruption of the ignition coil primary winding energizing circuit in timed relationship with the engine in response to each cycle of the timing signals, the improvement of an electronic engine speed ignition spark advance system for providing an increasing ignition spark advance with increasing engine speed greater than a selected value by producing, while the engine is operating at a speed equal to and greater than the selected value, and output ignition spark signal that is effective to override the timing signals to effect the interruption of the ignition coil primary winding energizing circuit at an engine crankshaft angle earlier than that at which it would be interrupted by the electronic control unit operating normally in response to the timing signals comprising:

means responsive to said timing signals for producing a first signal when the potential level of said alternating current timing signals across said electrical generator assembly output coil reaches a predetermined magnitude; and means including a trigger circuit that is operable to two different conditions of operation and is responsive to said first signal for producing a second signal upon the operation thereof to a selected one of said operating conditions in response to said first signal and for applying said second signal to said electronic control unit of said electronic ignition system combination in such a manner that said electronic control unit is responsive thereto to effect the interruption of said ignition coil primary winding energizing circuit whereby, while said engine is operating at a speed equal to and greater than said selected value, an increasing engine speed ignition spark advance is provided with increasing engine speed.

4. In an internal combustion engine electronic ignition system combination including an electrical generator assembly having a rotor member rotated in timed relationship with the engine and an output coil in which is induced a series of alternating current timing signals of an amplitude directly proportional to engine speed, an ignition coil having at least a primary winding connected in an electrical energizing circuit and an electrical signal responsive electronic control unit for effecting first the completion of and later the interruption of the ignition coil primary winding energizing circuit in timed relationship with the engine in response to each cycle of the timing signals, the improvement of an electronic engine speed ignition spark advance system for providing an increasing ignition spark advance with increasing engine speed greater than a selected value by producing, while the engine is operating at a speed equal to and greater than the selected value, an output ignition spark signal that is effective to override the timing signals to effect the interruption of the ignition coil primary winding energizing circuit at an engine crankshaft angle earlier than that at which it would be interrupted by the electronic control unit operating normally in response to the timing signals comprising:

means including input circuit means responsive to a selected input signal potential level for producing a first signal;

means including input circuit means responsive to a selected input signal potential level for producing a first signal;

means including output circuit means responsive to said timing signals for producing a reference potential upon said output circuit means that is of a selected minimum level while the potential level of said alternating current timing signals across said electrical generator assembly output coil is less than a selected value and that follows the potential level with respect to a point of reference potential upon a selected terminal end of said electrical generator assembly output coil while the potential level of said alternating current timing signals is equal to and greater than said selected value;

means for connecting the other terminal end of said electrical generator assembly output coil and said output circuit means of said reference potential producing means across said input circuit means of said means for producing said first signal;

means including a trigger circuit that is operable to two different conditions of operation and is responsive to said first signal for producing a second signal upon the operation thereof to a selected one of said operating conditions in response to said first signal and for applying said second signal to said electronic control unit of said electronic ignition system combination in such a manner that said electronic control unit is responsive thereto to effect the interruption of said ignition coil primary winding energizing circuit whereby, while said engine is operating at a speed equal to and greater than said selected value, an increasing engine speed ignition spark advance is provided with increasing engine speed;

means for latching said trigger circuit in the said selected one operating condition to which it is operated in response to said first signal whereby said second signal is maintained upon said electronic control unit of said electronic ignition system combination to prevent the reenergization of said ignition coil primary winding while said second signal is maintained; and means responsive to the normal operation of said electronic control unit of said electronic ignition system combination to effect the interruption of said ignition coil primary winding energizing circuit in response to the same cycle of said timing signals for unlatching said trigger circuit to effect a reversal of the condition of operation of said trigger circuit.

5. In an internal combustion engine electronic ignition system combination including an electrical generator assembly having a rotor member rotated in timed relationship with the engine and an output coil in which is induced a series of alternating current timing signals of an amplitude directly proportional to engine speed, an ignition coil having at least a primary winding connected in an electrical energizing circuit and an electrical signal responsive electronic control unit for effecting first the completion of and later the interruption of the ignition coil primary winding energizing circuit in timed relationship with the engine in response to each cycle of the timing signals, the improvement of an electronic engine speed ignition spark advance system for providing an increasing ignition spark advance with increasing engine speed greater than a selected value by producing, while the engine is operating at a speed equal to and greater than the selected value, an output ignition spark signal that is effective to override the timing signals to effect the interruption of the ignition coil primary winding energizing circuit at an engine crankshaft angle earlier than that at which it would be interrupted by the electronic control unit operating normally in response to the timing signals comprising:

means including input circuit means responsive to a selected input signal potential level for producing a first signal, means including output circuit means responsive to said timing signals for producing a reference potential upon said output circuit means that is of a selected minimum level while the potential level of said alternating current timing signals across said electrical generator assembly output coil is less than a selected value and that follows the potential level with respect to a point of reference potential upon a selected terminal end of said electrical generator assembly output coil while the potential level of said alternating current timing signals is equal to and greater than said selected value, said means including an NPN transistor having a control electrode and collector-emitter electrodes arranged for connection across an operating potential source in an emitter follower configuration;

means for connecting said selected terminal end of said electrical generator assembly output coil to said control electrode of said NPN transistor;

means for connecting the other terminal end of said output coil of said electrical generator assembly and said output circuit of said means for producing said reference potential across said input circuit means of said means for producing said first signal; and means responsive to said first signal for producing a second signal and for applying said second signal to said electronic control unit of said electronic ignition system combination in such a manner that said electronic control unit is responsive thereto to effect the interruption of said ignition coil primary winding energizing circuit whereby, while said engine is operating at a speed equal to and greater than said selected value, an increasing engine speed ignition spark advance is provided with increasing engine speed.

* * * * *

UNITED STATES PATENT AND TRADEMARK OFFICE
CERTIFICATE OF CORRECTION

PATENT NO. : 4,245,601
DATED : January 20, 1981
INVENTOR(S) : Lawrence W. Crowder It is certified that error appears in the above-identified patent and that said Letters Patent are hereby corrected as shown below:

Column 9, line 47, "When" should read -- With --.

Column 12, line 2, "35" should read -- 36 --.

Column 13, line 26, "baseemitter" should read -- base-emitter --.

Column 14, line 19, "baseemitter" should read -- base-emitter --.

Column 16, line 15, after "value", "and" should read -- an --.

Column 9, line 63, "NPN transistor 38" should read -- PNP transistor 38 --.

Column 17, delete lines 1-3.

Signed and Sealed this

*Thirtieth* Day of *June 1981*

[SEAL]

Attest:

RENE D. TEGTMEYER

*Attesting Officer*   *Acting Commissioner of Patents and Trademarks*